US006681647B2

(12) United States Patent
Mc Vicar et al.

(10) Patent No.: US 6,681,647 B2
(45) Date of Patent: Jan. 27, 2004

(54) ROTATIONAL SENSOR MECHANICAL LIMITER FOR AUTOMATIC CALIBRATION

(75) Inventors: David Mc Vicar, El Dorado, CA (US); David Wegmuller, Union City, CA (US)

(73) Assignee: Logitech Europe S.A. (CH)

( * ) Notice: Subject to any disclaimer, the term of this patent is extended or adjusted under 35 U.S.C. 154(b) by 49 days.

(21) Appl. No.: 10/172,774

(22) Filed: Jun. 14, 2002

(65) Prior Publication Data

US 2003/0230153 A1 Dec. 18, 2003

(51) Int. Cl.[7] .............................................. G01M 19/00
(52) U.S. Cl. ...................... 73/865.9; 73/121; 74/813 R; 74/560
(58) Field of Search .............................. 73/866.5, 865.9, 73/866.1, 121, 132; 74/813 R, 560; 345/156, 161; 463/36, 37, 38, 46, 48

(56) References Cited

U.S. PATENT DOCUMENTS 6,404,417 B1 * 6/2002 Mc Vicar ................... 345/165

* cited by examiner

Primary Examiner—Thomas P. Noland
(74) Attorney, Agent, or Firm—Townsend and Townsend and Crew LLP

(57) ABSTRACT

Embodiments of the present invention are directed to preventing calibration of a device to exceed the full design travel, for instance, during aggressive operation or play. A limiter is coupled to the rotational sensor to limit the full travel output signal to a fixed and repeatable maximum value no matter how aggressive the operation or play becomes. The limit is desirably set at such a point as normal operation or play will always reach. In this way, the automatic calibration of the device will not exceed the full design travel. In one embodiment, an input device comprises a user manipulable object configured to rotate around a rotational axis relative to a base. A rotational sensor includes a sensor body coupled with a sensor shaft which is rotatable relative to the sensor body around the rotational axis. The sensor shaft is connected with the user manipulable object to rotate with the user manipulable object around the rotational axis. An actuator is coupled with the user manipulable object to rotate with the user manipulable object. The actuator is configured to be coupled with the sensor body, after the user manipulable object has rotated to reach a preset limit, to rotate the sensor body with the sensor shaft and the user manipulable object beyond the preset limit.

20 Claims, 5 Drawing Sheets

ROTATIONAL SENSOR MECHANICAL LIMITER FOR AUTOMATIC CALIBRATION

BACKGROUND OF THE INVENTION

This invention relates generally to calibration of devices and, more particularly, to the use of flexible mechanical limiters to locate a rotational sensor for automatically calibrating devices in high impact environments.

Rotational sensors are used to provide rotation measurements of many different devices, including those that sustain impacts, such as joystick gimbals, shifter paddles, steering wheels, brake and accelerator pedal assemblies, and the like. An input device may have a full design travel for the rotational sensor to measure during normal operation or play. During aggressive operation or play, however, the travel may exceed the full design travel of the device, and the device is automatically calibrated. The load or force typical of normal operation will be unable to achieve the full design travel because the input device has been automatically calibrated to a larger travel during aggressive operation or play.

BRIEF SUMMARY OF THE INVENTION

Embodiments of the present invention are directed to preventing calibration of an input device to exceed the full design travel, for instance, during aggressive operation or play. A limiter is coupled to the rotational sensor to limit the full travel output signal to a fixed and repeatable maximum value no matter how aggressive the operation or play becomes. The limit is desirably set at such a point as normal operation or play will always reach. In this way, the automatic calibration of the input device will not exceed the full design travel.

In accordance with an aspect of the present invention, an input device comprises a user manipulable object configured to rotate around a rotational axis relative to a base. A rotational sensor includes a sensor body coupled with a sensor shaft which is rotatable relative to the sensor body around the rotational axis. The sensor shaft is connected with the user manipulable object to rotate with the user manipulable object around the rotational axis. An actuator is coupled with the user manipulable object to rotate with the user manipulable object. The actuator is configured to be coupled with the sensor body, after the user manipulable object has rotated to reach a preset limit, to rotate the sensor body with the sensor shaft and the user manipulable object beyond the preset limit.

In some embodiments, a mounting mechanism is coupled with the rotational sensor to permit movement of the sensor body with the sensor shaft except in rotation with respect to the rotational axis in at least one of a clockwise direction and a counterclockwise direction which is constrained by the mounting mechanism. The sensor body includes a protrusion. The mounting mechanism comprises a first surface provided on the base and being disposed generally laterally relative to the rotational axis and contacting a first side of the protrusion to constrain rotation of the sensor body around the rotational axis in a first direction which is a clockwise or a counterclockwise direction. The mounting mechanism comprises a second surface provided on the base and being disposed generally laterally relative to the rotational axis and contacting a second side of the protrusion to constrain rotation of the sensor body around the rotational axis in a rotational direction opposite from the first direction. The protrusion of the sensor body includes a generally spherical distal end and the first surface contacts the generally spherical distal end to permit movement of the sensor body with the sensor shaft except rotation of the sensor body around the rotational axis which is constrained by the first surface. The first surface of the mounting mechanism comprises a spring.

In specific embodiments, the sensor shaft of the rotational sensor is substantially immovably connected to the user manipulable object to move with the user manipulable object. The actuator comprises a pair of actuator arms disposed on opposite sides of the sensor body. The user manipulable object comprises a pedal having a pedal bushing which is rotatably supported on the base to rotate around a pedal bushing axis. The sensor shaft extends into a pedal bushing aperture along the pedal bushing axis.

In accordance with another aspect of the invention, an input device comprises a user manipulable object configured to rotate around a rotational axis relative to a base. The user manipulable object has an aperture configured to receive a sensor shaft of a rotational sensor to rotate the sensor shaft with the user manipulable object relative to the sensor body around the rotational axis. An actuator is coupled with the user manipulable object to rotate with the user manipulable object. The actuator is configured to be coupled with the sensor body, after the user manipulable object has rotated to reach a preset limit, to rotate the sensor body with the sensor shaft and the user manipulable object beyond the preset limit.

In some embodiments, the mounting mechanism comprises a spring having at least one contact surface to contact the sensor body and constrain rotation of the sensor body around the rotational axis in at least one of a clockwise direction and a counterclockwise direction. The actuator comprises a pair of actuator tabs disposed on opposite sides of the aperture of the user manipulable object and configured to be coupled with the sensor body on opposite sides of the sensor body.

Another aspect of the present invention is directed to a method of limiting travel of a rotational sensor for an input device to a preset limit. The method comprises connecting a sensor shaft of a rotational sensor to a user manipulable object of an input device which is configured to rotate with the sensor shaft around a rotational axis relative to a base; mounting a sensor body of the rotational sensor to permit movement of the sensor body with the sensor shaft except rotation with respect to the rotational axis which is constrained; and, after the user manipulable object has rotated to reach a preset limit, coupling the sensor body to the user manipulable object to rotate with the user manipulable object and the sensor shaft beyond the preset limit.

In some embodiments, after the user manipulable object has rotated to reach a preset limit, the sensor body is coupled to the user manipulable object to rotate with the user manipulable object and the sensor shaft beyond the preset limit in the clockwise direction at one end of the preset limit and in the counterclockwise direction at another end of the preset limit.

BRIEF DESCRIPTION OF THE DRAWINGS

FIG. 5A is a perspective view of the rotational sensor according to an embodiment of the inventions;

DETAILED DESCRIPTION OF THE INVENTION

Figure 1:
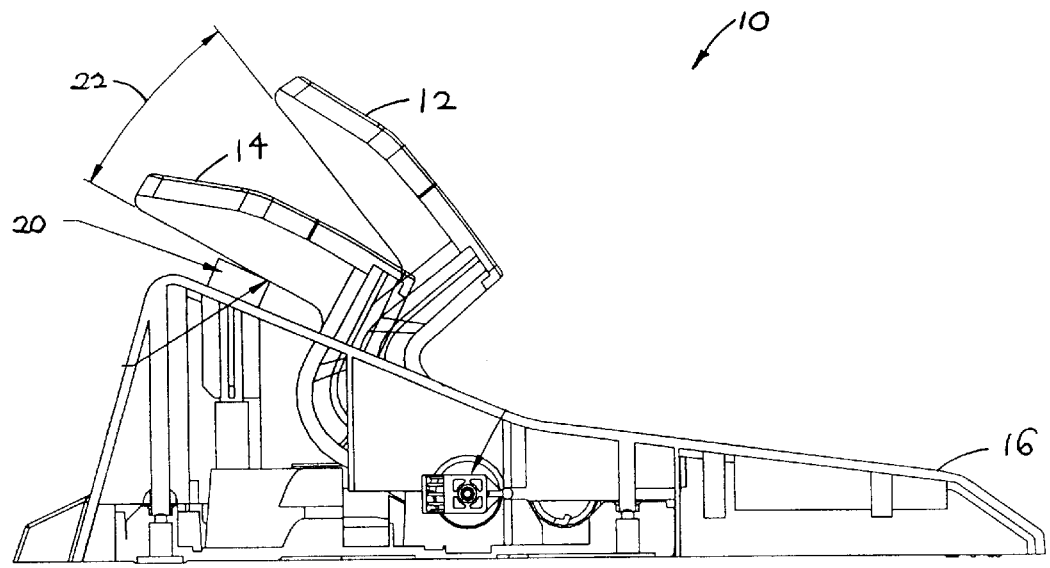
FIG. 1 is an elevational view of a pedal apparatus illustrating a pedal at a full throttle/braking rotation during "normal" play.
Figure 2:
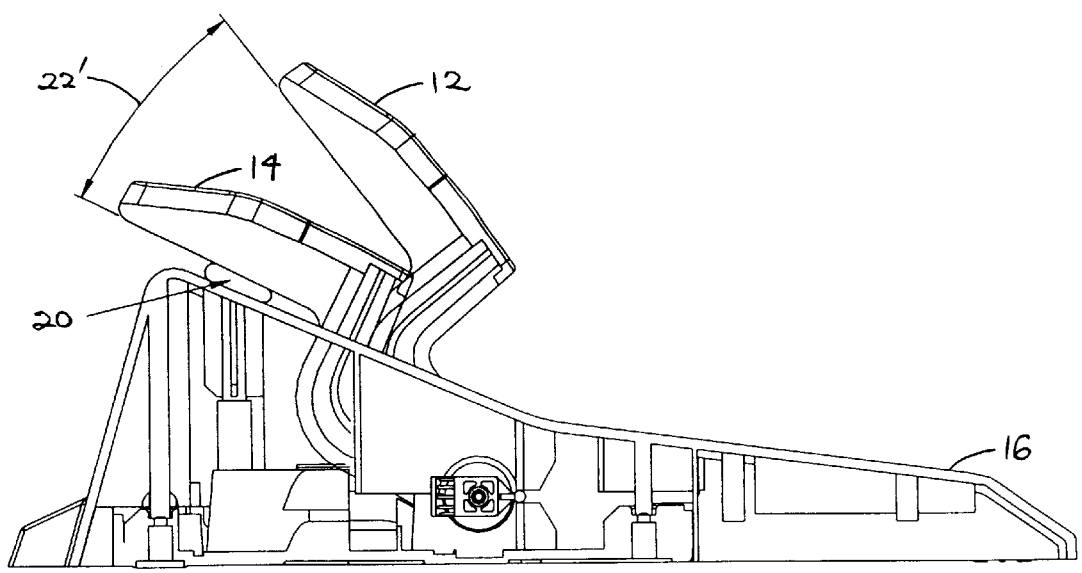
FIG. 2 is an elevational view of the pedal apparatus of FIG. 1 illustrating the pedal at a full throttle/braking rotation during "aggressive" play.

FIG. 1 shows a pedal apparatus 10 having an accelerator pedal 12 and a brake pedal 14 which are rotatably supported on a base 16. To reduce noise and prevent damage to the pedals, stop pads are used as a cushion when the pedals have reached the full design travel. FIG. 1 shows one such stop pad 20 for the pedal 14 after it has reached its full design travel 22 by rotation in the counterclockwise direction. The stop pad 20 may be made of a high durometer material such as a high durometer rubber or the like. For example, if the pedal 12 or 14 is pressed through 25° of rotation during "normal" play, stopping just as contact with the stop pad 20 is made, then 0° to 25° represents positions of "no throttle/braking" to "maximum throttle/braking." If, during game play, the pedal 12 or 14 is aggressively pressed resulting in greater deformation of the stop pad 20 as well as the plastic parts that make up the assembly, as illustrated in FIG. 2, then a greater rotation of the pedal will result. For example, if the aggressively pressed pedal travels by 28° instead of 25°, then the new full throttle/braking rotation 22' is 28°. The pedal apparatus 10 has been automatically calibrated by the user during game play to have the new full throttle/braking rotation of 28°. Consequently, when the user returns to pedal forces typical of "normal" play (with a maximum throttle/braking 22 at 25°), the user will be unable to achieve full throttle/brake travel 22' (at 28°) again.

Figure 3:
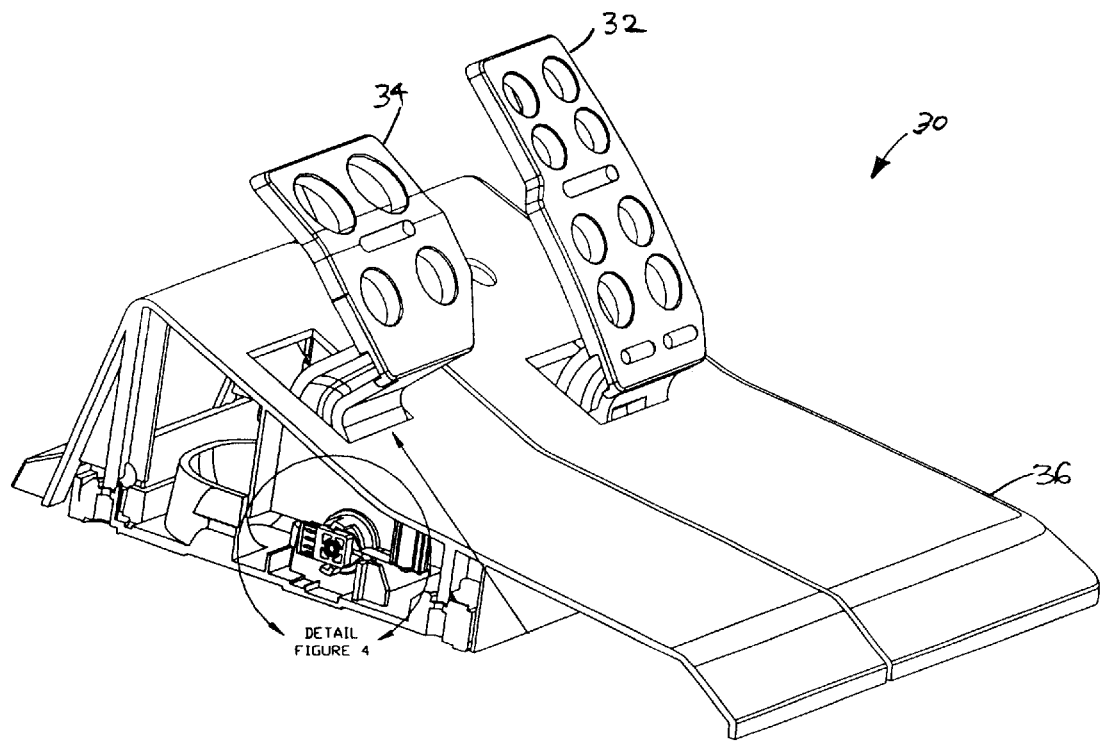
FIG. 3 is a perspective view of a pedal apparatus according to an embodiment of the present invention.
Figure 4:
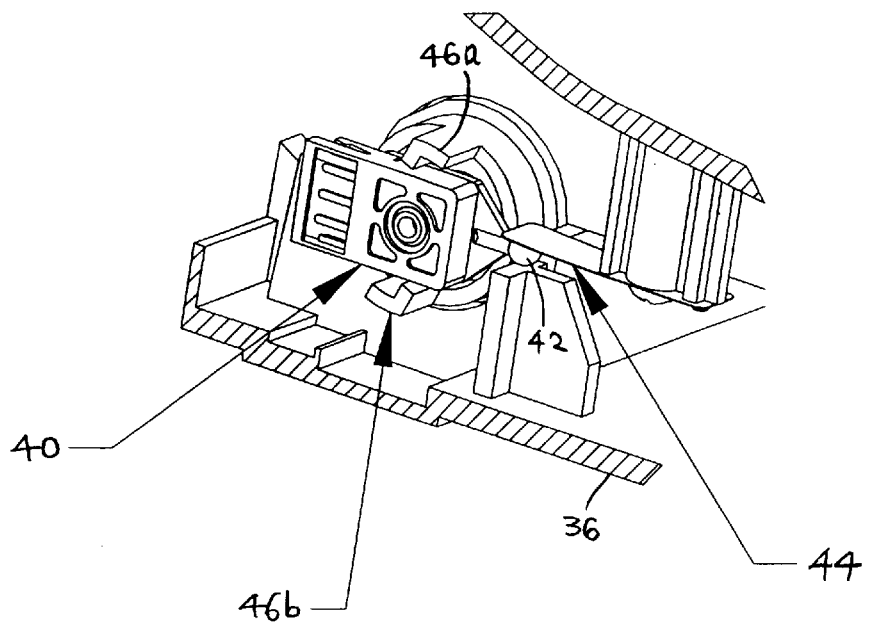
FIG. 4 is a close-up perspective view of the rotational sensor and mechanical limiter in the pedal apparatus of FIG. 3 according to an embodiment of the present invention.
Figure 5:
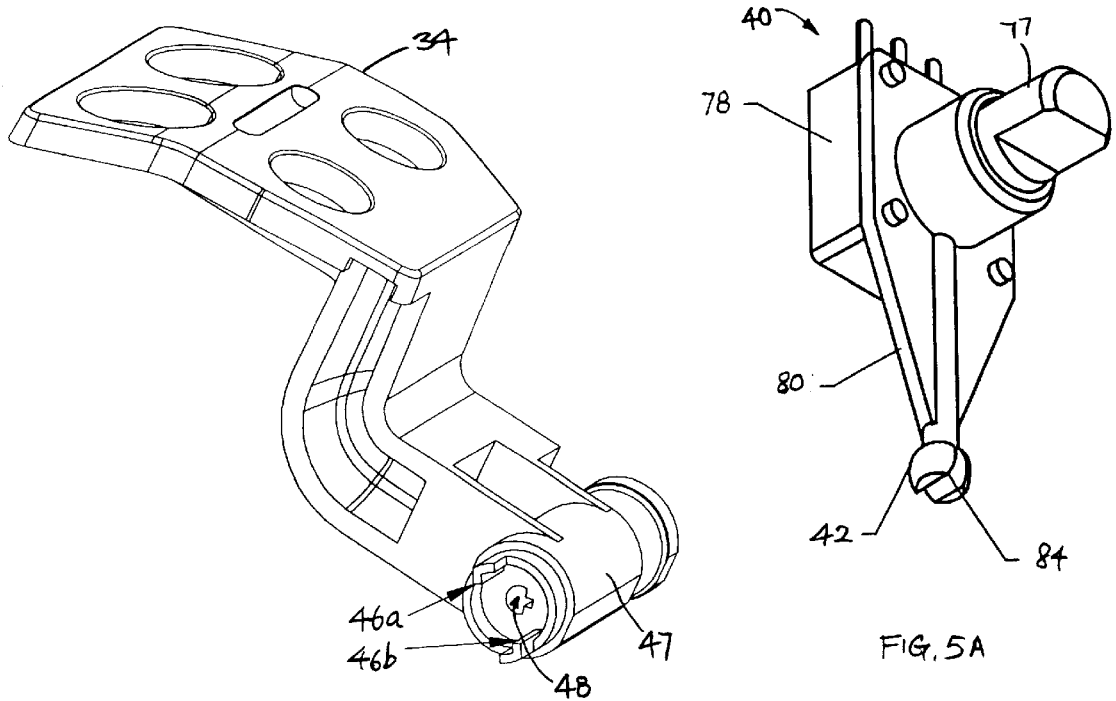
FIG. 5 is a perspective view of a set of actuator arms connected with a pedal in the pedal apparatus of FIG. 3 according to an embodiment of the present invention.

In FIG. 3, the pedal apparatus 30 includes two pedals 32, 34 rotatably supported on a base 36. As best seen in FIG. 4, the pedal apparatus 30 includes a rotational sensor 40 having a distal end 42 that is constrained in counterclockwise rotation by a mechanical limiter 44 mounted to the base 36. The mechanical limiter 44 may be, for instance, a retention spring that can take the form of a flat spring, a coil spring, molded in plastic springs, or the like. A set of actuator arms or tabs 46a, 46b are connected to the pedal 34 to turn the body of the sensor 40 when the desired degree of rotation of the pedal 34 and thus the actuator arms 46a, 46b has been reached. As more clearly seen in FIG. 5, the set of actuator arms 46a, 46b are spaced about 180° from one another in a pedal bushing 47 which is connected with or integrally formed with the pedal 34. The pedal bushing 47 includes an actuator opening or actuator key opening 48 extending along an actuator axis. The set of actuator arms 46a, 46b are disposed on opposite sides of the body of the sensor 40. In another embodiment, one actuator arm is sufficient for turning the body of the sensor 40.

In specific embodiments, the sensor 40 is a direct drive rotational sensor adapted to withstand off-axis loading as disclosed in U.S. patent application Ser. No. 09/273,894, filed Mar. 22, 1999, now U.S. Pat. No. 6,404,417, entitled "Direct Drive Rotational Sensor Adapted to Withstand Off-Axis Loading," which is incorporated herein by reference in its entirety. FIG. 5A shows an embodiment of such a sensor. In FIG. 5A, the sensor 40 has a sensor shaft 77 extending from a sensor body 78 and being configured to be inserted into the actuator key opening 48 of the pedal bushing 47. The axis of the sensor shaft 77 is generally aligned with the actuator axis through the actuator key opening 48. The sensor shaft 77 is desirably connected to the pedal bushing 47 via a press fit or an interference fit to form a direct drive connection to remove backlash and improve sensor accuracy.

As seen in FIG. 5A, the rotational sensor 40 includes a lateral protrusion 80 extending generally radially from the sensor body 78 away from the axis of the sensor shaft 77. At the end of the lateral protrusion 80 is a distal end 42, which is desirably spherical. The distal end 42 desirably includes a slot or slit 84. When assembled, the distal end 42 is constrained in the counterclockwise direction by the mechanical limiter 44, as shown in FIG. 4. The limiter 44 is desirably somewhat flexible, and contacts the distal end 42 to constrain but not necessarily prevent rotation of the sensor body 78 relative to the axis of the sensor shaft 77. As described below, the limiter 44 prevents rotation of the sensor body 78 relative to the axis of the sensor shaft 77 before a preset limit of travel is reached, and constrains rotation of the sensor body 78 after the preset limit of travel is reached.

The generally spherical distal end 42 provides substantial freedom in other degrees of movement that are unconstrained. For example, except for rotation relative to the axis of the sensor shaft 77, the sensor body 78 moves with the pedal bushing 47 in five degrees of freedom that include front-back, left-right, up-down, and pitch and yaw with respect to the actuator axis of the pedal bushing 47. By allowing the sensor body 78 to move with the pedal bushing 47 in the five degrees of freedom, the mounting mechanism for the sensor 40 does not induce any bending forces between the sensor shaft 77 and the sensor body 78. Because the torque for rotating the sensor shaft 77 relative to the sensor body 78 is very low, the force on the lateral protrusion 80 is very low and no damage will occur. In this way, the only forces that the internal mechanisms of the sensor 40 experiences are those that rotate the wiper coupled to the shaft 77 in the sensor 40. As a result, the mounting mechanism for the sensor 40 substantially eliminates off-axis forces (i.e., forces other than rotation about the axis of the sensor shaft 77) from causing strain in the internal mechanisms of the sensor 40, thereby facilitating improvement in sensor performance by eliminating backlash without causing damage to the sensor 40. The distal end 42 is typically made of a plastic or polymer material which provides for a certain level of flexibility and resiliency.

Figure 6:
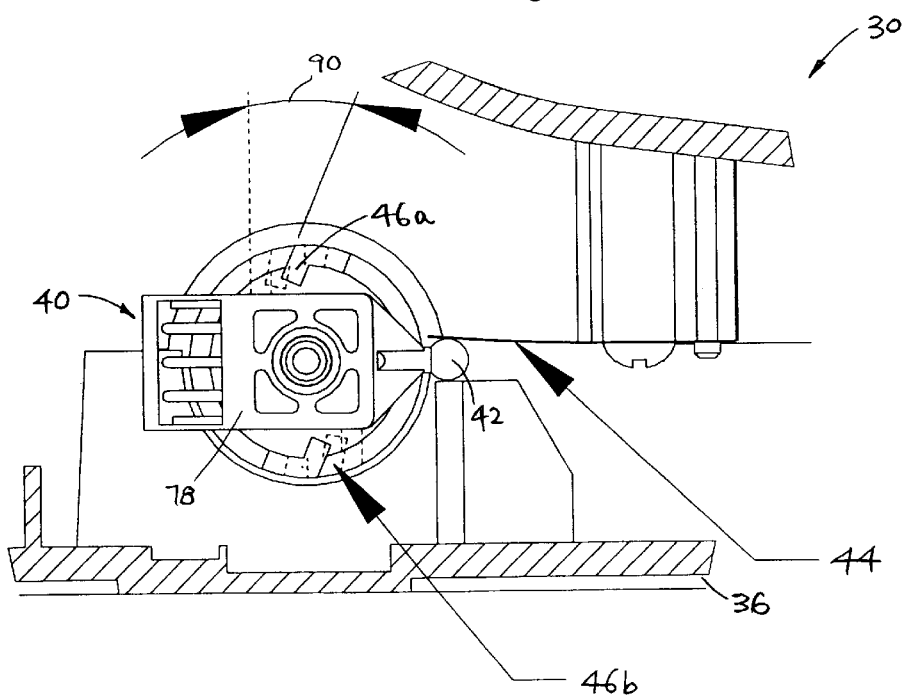
FIG. 6 is an elevational view of the rotational sensor and mechanical limiter of FIG. 4 illustrating the actuator arms of FIG. 5 in an initial position.
Figure 7:
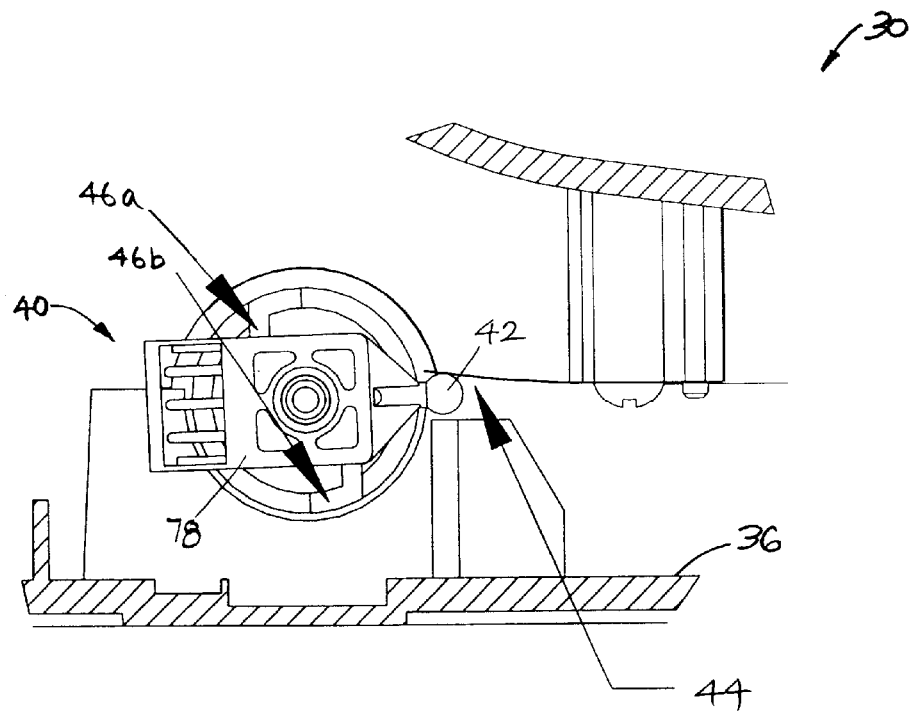
FIG. 7 is an elevational view of the rotational sensor and mechanical limiter of FIG. 4 illustrating the actuator arms of FIG. 5 in a full throttle/braking position.

FIGS. 6 and 7 illustrate the use of the mechanical limiter 44 with the rotational sensor 40 for automatic calibration of the pedal apparatus 30. Initially at rest, the pedal 34 is held at an upper limit by torsion springs or the like pushing the pedal 34 against mechanical stops molded into the plastic case or base 36, as shown in FIG. 3. In this position, the limit actuator arms 46a, 46b are positioned such that the rotation of the pedal 34 through a given angle 90 can occur without rotating the body of the rotational sensor 40, as seen in FIG. 6. The rotation of the pedal 34 turns the pedal bushing 47 counterclockwise, which rotates the sensor shaft 77 with respect to the sensor body 78. During rotation of the sensor shaft 77 by the pedal 34, the mechanical limiter 44 prevents the rotation of the sensor body 78 by countering the torque created by the turning of the sensor shaft 77. The sensor shaft 77 is keyed into the center of the pedal bushing 47 and rotates with the pedal 34 at all times, providing angular readout of the position of the pedal 34. When the angular limit 90 on the designed rotation is exceeded but before the pedal 34 reaches the full travel mechanical stop (e.g., stop 20 in FIG. 1), the actuator arms 46a, 46b engage the body 78 of the rotational sensor 40 and cause the sensor body 78 to rotate with the pedal bushing 47, as seen in FIG. 7. The mechanical limiter 44 deforms or bends with the added torque on the sensor body 78, as the sensor body 78 and the distal end 42 bearing against the mechanical limiter 44 are being turned by the pedal 34. At this time and for all further rotation, the sensor body 78 and sensor shaft 77 rotate as one unit resulting in no relative motion between the sensor's active surface which is attached to the sensor body 78 and the mechanical contacts attached to the sensor shaft 77. This limits the full travel output signal to a fixed and repeatable maximum value no matter how much force is applied to the pedal 34. The limit is desirably set at such a point as "normal" game play will always reach, but not so short that it creates pedal travel dead band that is noticeable by the user.

Figure 8:
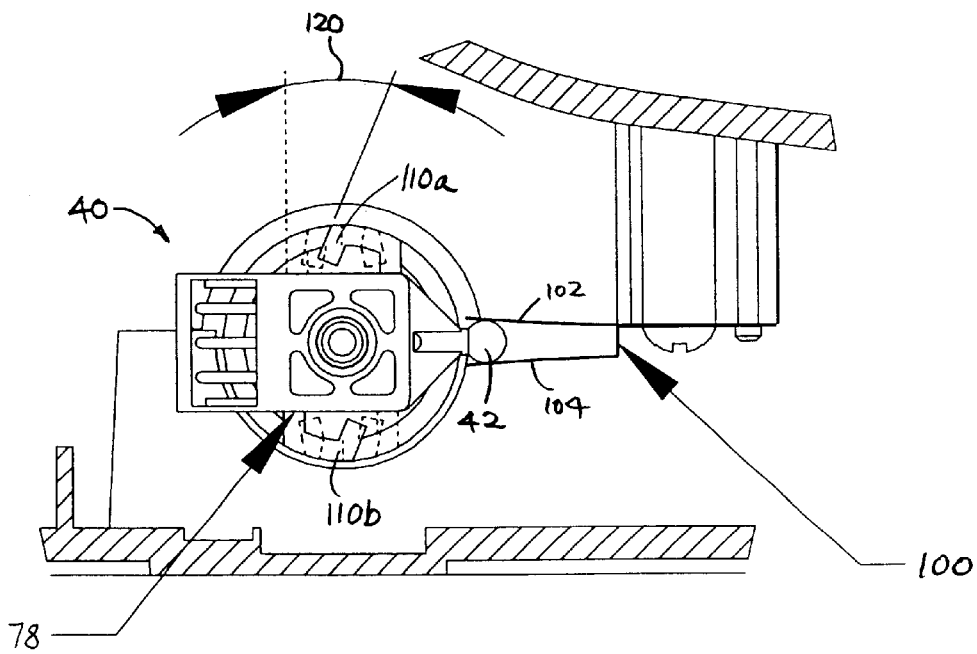
FIGS. 8 is an elevational view of the rotational sensor and mechanical limiter in the pedal apparatus of FIG. 3 according to another embodiment of the present invention.
Figure 9:
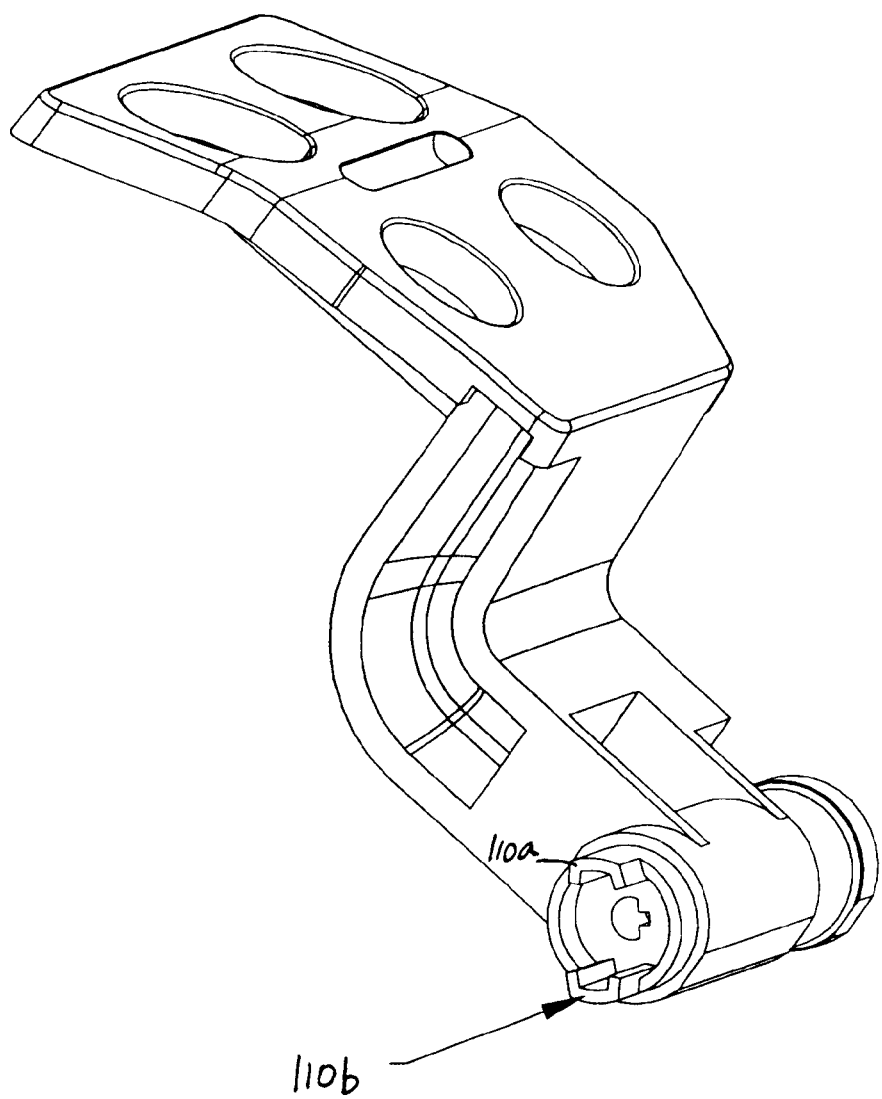
FIG. 9 is a perspective view of a set of actuator arms connected with a pedal in the pedal apparatus of FIG. 3 according to another embodiment of the present invention.

In another embodiment as shown in FIGS. 8 and 9, the mechanical limiter 100 is configured to constrain rotation of the sensor body 78 in both clockwise and counterclockwise directions. The mechanical limiter 100 includes an upper limiter 102 and a lower limiter 103 disposed on opposite sides of the distal end 42 of the sensor 40. The upper limiter 102 constrains rotation of the sensor body 78 in the counterclockwise direction, while the lower limiter 104 constrains rotation of the sensor body 78 in the clockwise direction. As shown in FIGS. 8 and 9, the actuator arms 110a, 110b are configured to locate or bear against the sensor body 78 in the clockwise direction (after rotating through a clockwise angular limit) and the counterclockwise direction (after rotating through a counterclockwise angular limit). FIG. 8 shows the sum of the clockwise angular limit and counterclockwise angular limit as angle 120.

The contact surfaces of the upper limiter 102 and lower limiter 104 desirably contact the distal end 42 at two contact points with an interference fit that constrains the sensor body 78 from rotating relative to the axis of the sensor shaft 77 while providing substantially unconstrained movement in the remaining five degrees of freedom. As plastics and hard polymers tend to creep, eventually the stress created by the interference fit may reach a point on the stress curve of the material where the creeping stops, but there desirably will still be no clearance between the upper and lower limiters 102, 104 and the distal end 42 to ensure a snug fit therebetween.

The above-described arrangements of apparatus and methods are merely illustrative of applications of the principles of this invention and many other embodiments and modifications may be made without departing from the spirit and scope of the invention as defined in the claims. For instance, different types of sensor can be used and different types of limiters can be used. The actuator arms can be configured differently. The scope of the invention should, therefore, be determined not with reference to the above description, but instead should be determined with reference to the appended claims along with their full scope of equivalents.

What is claimed is:

1. An input device comprising:
   a user manipulable object configured to rotate around a rotational axis relative to a base;
   a rotational sensor including a sensor body coupled with a sensor shaft which is rotatable relative to the sensor body around the rotational axis, the sensor shaft being connected with the user manipulable object to rotate with the user manipulable object around the rotational axis;
   an actuator coupled with the user manipulable object to rotate with the user manipulable object, the actuator being configured to be coupled with the sensor body, after the user manipulable object has rotated to reach a preset limit, to rotate the sensor body with the sensor shaft and the user manipulable object beyond the preset limit.

2. The input device of claim 1 further comprising a mounting mechanism coupled with the rotational sensor to permit movement of the sensor body with the sensor shaft except in rotation with respect to the rotational axis in at least one of a clockwise direction and a counterclockwise direction, which is constrained by the mounting mechanism.

3. The input device of claim 2 wherein the sensor body includes a protrusion, and wherein the mounting mechanism comprises a first surface provided on the base and being disposed generally laterally relative to the rotational axis and contacting a first side of the protrusion to constrain rotation of the sensor body around the rotational axis in a first direction which is a clockwise or a counterclockwise direction.

4. The input device of claim 3 wherein the mounting mechanism comprises a second surface provided on the base and being disposed generally laterally relative to the rotational axis and contacting a second side of the protrusion to constrain rotation of the sensor body around the rotational axis in a rotational direction opposite from the first direction.

5. The input device of claim 3 wherein the protrusion of the sensor body includes a generally spherical distal end and the first surface contacts the generally spherical distal end to permit movement of the sensor body with the sensor shaft except rotation of the sensor body around the rotational axis which is constrained by the first surface.

6. The input device of claim 3 wherein the first surface of the mounting mechanism comprises a spring.

7. The input device of claim 1 wherein the sensor shaft of the rotational sensor is substantially immovably connected to the user manipulable object to move with the user manipulable object.

8. The input device of claim 1 wherein the actuator comprises a pair of actuator arms disposed on opposite sides of the sensor body.

9. The input device of claim 1 wherein the user manipulable object comprises a pedal having a pedal bushing which is rotatably supported on the base to rotate around a pedal bushing axis, and wherein the sensor shaft extends into a pedal bushing aperture along the pedal bushing axis.

10. An input device comprising:
    a user manipulable object configured to rotate around a rotational axis relative to a base, the user manipulable object having an aperture configured to receive a sensor shaft of a rotational sensor to rotate the sensor shaft with the user manipulable object relative to the sensor body around the rotational axis; and
    an actuator coupled with the user manipulable object to rotate with the user manipulable object, the actuator being configured to be coupled with the sensor body, after the user manipulable object has rotated to reach a preset limit, to rotate the sensor body with the sensor shaft and the user manipulable object beyond the preset limit.

11. The input device of claim 10 further comprising a mounting mechanism configured to be coupled with the rotational sensor to permit movement of the sensor body with the sensor shaft except in rotation with respect to the rotational axis in at least one of a clockwise direction and a counterclockwise direction which is constrained by the mounting mechanism.

12. The input device of claim 11 wherein the mounting mechanism comprises a spring having at least one contact surface to contact the sensor body and constrain rotation of the sensor body around the rotational axis in at least one of a clockwise direction and a counterclockwise direction.

13. The input device of claim 10 wherein the actuator comprises a pair of actuator tabs disposed on opposite sides of the aperture of the user manipulable object and configured to be coupled with the sensor body on opposite sides of the sensor body.

14. The input device of claim 10 wherein the aperture of the user manipulable object is configured to be substantially immovably connected to the sensor shaft of the rotational sensor.

15. A method of limiting travel of a rotational sensor for an input device to a preset limit, the method comprising:

connecting a sensor shaft of a rotational sensor to a user manipulable object of an input device which is configured to rotate with the sensor shaft around a rotational axis relative to a base;

mounting a sensor body of the rotational sensor to permit movement of the sensor body with the sensor shaft except rotation with respect to the rotational axis which is constrained; and after the user manipulable object has rotated to reach a preset limit, coupling the sensor body to the user manipulable object to rotate with the user manipulable object and the sensor shaft beyond the preset limit.

16. The method of claim 15 wherein the sensor shaft is substantially immovably connected to the user manipulable object to move with the user manipulable object.

17. The method of claim 15 wherein mounting the sensor body comprises providing at least one contact surface to contact the sensor body and constrain rotation of the sensor body around the rotational axis in at least one of a clockwise direction and a counterclockwise direction.

18. The method of claim 17 wherein a pair of contact surfaces are provided to contact opposite sides of a generally spherical distal end of the sensor body to constrain rotation of the sensor body around the rotational axis in the clockwise and counterclockwise directions.

19. The method of claim 15 wherein coupling the sensor body to the user manipulable object comprises providing at least one actuator arm to contact the sensor body and rotate the sensor body with the user manipulable object after the user manipulable object has rotated to reach a preset limit.

20. The method of claim 15 wherein, after the user manipulable object has rotated to reach a preset limit, the sensor body is coupled to the user manipulable object to rotate with the user manipulable object and the sensor shaft beyond the preset limit in the clockwise direction at one end of the preset limit and in the counterclockwise direction at another end of the preset limit.

* * * * *